United States Patent [19]
Takagi

[11] Patent Number: 5,953,699
[45] Date of Patent: Sep. 14, 1999

[54] SPEECH RECOGNITION USING DISTANCE BETWEEN FEATURE VECTOR OF ONE SEQUENCE AND LINE SEGMENT CONNECTING FEATURE-VARIATION-END-POINT VECTORS IN ANOTHER SEQUENCE

[75] Inventor: Keizaburo Takagi, Tokyo, Japan

[73] Assignee: NEC Corporation, Tokyo, Japan

[21] Appl. No.: 08/959,465

[22] Filed: Oct. 28, 1997

[30] Foreign Application Priority Data

Oct. 28, 1996 [JP] Japan ................................ 8-285532

[51] Int. Cl.$^6$ ................................................ G01L 3/02
[52] U.S. Cl. ........................ 704/238; 704/239; 704/243
[58] Field of Search ................................ 704/233, 238, 704/239, 243

[56] References Cited

U.S. PATENT DOCUMENTS

| | | | |
|---|---|---|---|
| 4,181,821 | 1/1980 | Pirz et al. ................................ | 704/252 |
| 4,571,697 | 2/1986 | Watanabe ................................ | 704/238 |
| 4,608,708 | 8/1986 | Watanabe ................................ | 704/238 |
| 4,737,976 | 4/1988 | Borth et al. ................................ | 455/563 |
| 4,783,802 | 11/1988 | Takebayashi et al. .................... | 704/243 |
| 4,933,973 | 6/1990 | Porter ........................................ | 704/233 |

FOREIGN PATENT DOCUMENTS

| | | | |
|---|---|---|---|
| 0 526 347 A2 | 2/1993 | European Pat. Off. .......... | G10L 5/06 |
| 58-111099 | 7/1983 | Japan . | |
| 58-115490 | 7/1983 | Japan . | |
| 4-264596 | 9/1992 | Japan ................................ | G10L 3/00 |

OTHER PUBLICATIONS

Berouti et al., "Enhancement of Speech Corrupted by Acoustic Noise", Bolt Baranek and Newman Inc., Cambridge, Mass., IEEE, 208–211 (1979).

Ohno et al., "Utterance Normalization Using Vowel Features in a Spoken Word Recognition System for Multiple Speakers," *IEEE Speech Processing*, Apr. 27, 1993, pp. II–578 to II–581.

*Primary Examiner*—David R. Hudspeth
*Assistant Examiner*—Tālivaldis Ivars Šmits
*Attorney, Agent, or Firm*—Foley & Lardner

[57] ABSTRACT

A speech recognition apparatus has an analysis section that outputs features of input speech as a time sequence of feature vectors defined for discrete time points corresponding to a processed speech frame. Reference paradigm utterances are converted into a time sequence of standard (reference) feature vectors. The possible continuous variation of standard feature vectors at each point in time is expressed by a line segment, or set of line segments, connecting the feature vectors for the two end points of the "movable" range within which the feature can change, rather than using a larger set of reference vectors as in a conventional multitemplate approach to speech recognition. For example, the continuous range of possible background noise levels in input speech defines a line segment connecting the two feature vectors at the two SNR value limits. A matching apparatus calculates the distance between the input speech feature vector at each time point and the reference line segment endpoints and the perpendicular distance to the reference line segment (where meaningful), for each reference line segment corresponding to that particular time. The distance between each input feature and each standard (reference) feature sequence, represented by its line segment at a given time, is defined as the smallest of these three (or two) computed distance values.

20 Claims, 3 Drawing Sheets

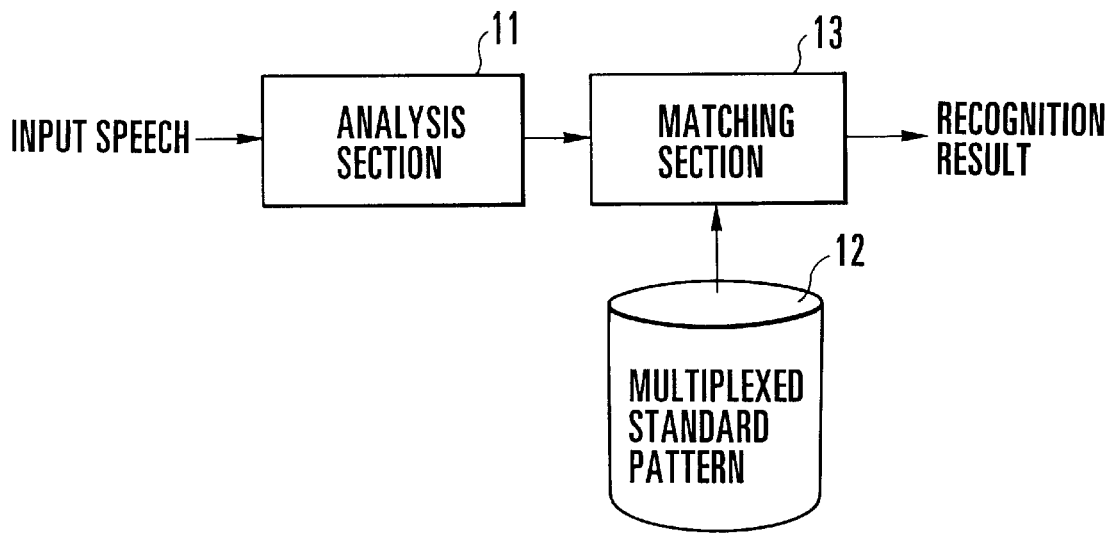
F I G. 1
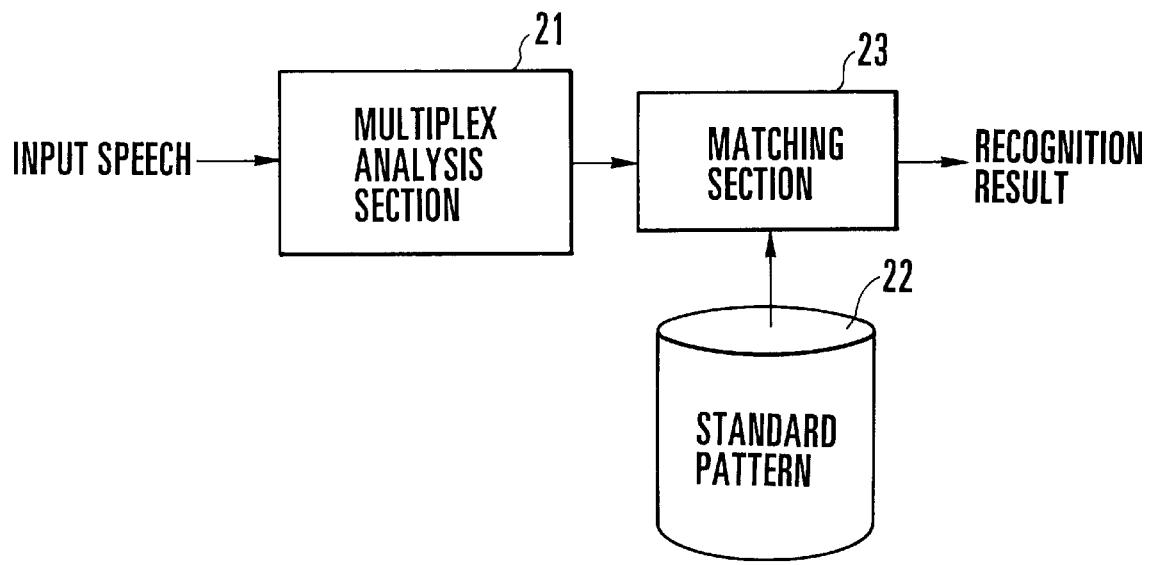
F I G. 2

SPEECH RECOGNITION USING DISTANCE BETWEEN FEATURE VECTOR OF ONE SEQUENCE AND LINE SEGMENT CONNECTING FEATURE-VARIATION-END-POINT VECTORS IN ANOTHER SEQUENCE

BACKGROUND OF THE INVENTION

The present invention relates to a speech recognition apparatus and, more particularly, to a speech recognition apparatus which can approximate the movable range of the feature vector at each time point, and execute a distance calculation such that the optimal combination of all the combinations within the range is obtained as a distance value.

According to a conventional matching method for speech recognition, input speech is converted into a time series data of feature vectors of one type, and standard speech is analyzed and converted into feature vectors of one type by the same method as that used for the input speech to be stored as a standard pattern. The distances between these vectors are then calculated by using a matching method such as DP matching which allows nonlinear expansion/contraction in the time axis direction. The category of the standard pattern which exhibits the minimum distance is output as the recognition result. At each time point in matching, the distance or similarity between one feature vector of the input speech and one feature vector of a standard pattern is calculated.

According to this method, however, since the voices generated by different speakers greatly vary in feature in many cases even if the contents of utterances are the same, high performance cannot be obtained with respect to speech from a speaker different from standard speakers. Even with respect to speech from a single speaker, stable performance cannot be obtained when the feature of the speech changes due to the speaker's physical condition, a psychological factor, and the like. To solve this problem, a method called a multi-template scheme has been used.

A multi-template is designed such that a plurality of standard speaker voices are converted into a plurality of feature vectors to form standard patterns, and the feature of the standard pattern at each time point is expressed by a plurality of feature vectors. A distance calculation is performed by a so-called Viterbi algorithm of obtaining the distances or similarities between all the combinations of one input feature vector and a plurality of feature vectors of standard patterns at each time point, and using the optimal one of the obtained distances or similarities, a so-called Baum-Welch algorithm of expressing the feature at each time point by the weighted sum of all distances or similarities, a semi-continuous scheme, or the like.

In the conventional distance calculating methods for speech recognition, even in the method using a multi-template, differences between voices are expressed by only discrete points in a space, and distances or similarities are calculated from only finite combinations of the points. In many cases, these methods cannot satisfactorily express all events that continuously changer and hence high recognition performance cannot be obtained.

For examples such events include speech recognition performed in the presence of large ambient noise. In the presence of ambient noise, noise spectra are added to an input speech spectrum in an additive manner. In addition, the level of the noise varies at the respective time points, and hence cannot be predicted. For example, in a known conventional scheme, to solve this problem, standard pattern speech is formed by using a finite number of several types of SNRs (Signal to Noise Ratios), and speech recognition is performed by using multi-templates with different SNR conditions.

Since infinite combinations of SNRs of input speech are present, and are difficult to predict, it is theoretically impossible to solve the above problem by using a finite number of templates. It is seemingly possible to express a continuous change by a sufficient number of discrete points so as to improve the calculation precision to such an extent that an error can be approximately neglected. It is practically impossible in terms of the cost for data collection to collect enough voices from many speakers to cover all SNRs in all noise environments under SNR conditions. Even if such data collection is possible, the memory capacity and the amount of distance calculation which are required to express continuous events by many points are enormous. In this case, therefore, an inexpensive apparatus cannot be provided.

Other events in which the feature of speech continuously changes include the case of a so-called Lombard effect in which speech generated in the presence of noise itself changes when the speaker hears the noise, and a case in which the features of voices from an extremely large number of speakers change.

SUMMARY OF THE INVENTION

It is an object of the present invention to provide a high-performance speech recognition apparatus in which the range of changes of an event in which the feature of speech continuously changes at each time point Is described with a pair of vectors at two ends, and a distance calculation can be performed, with respect to a line segment defined by the two vectors, by using a vector which can freely move within the range defined by the line segment.

It is another object of the present invention to provide an inexpensive, high--performance speech recognition apparatus.

In order to achieve the above objects, according to the present invention, there is provided a speech recognition apparatus comprising analysis means for outputting a feature of input speech at each time point as time series data of a feature vector, multiplexed (In the present specification, the term 'multiplexed' is used to indicate that the plurality of different vectors that are defined for a single time point share the same position in the time series data.) standard patterns obtained by converting a feature of standard speaker voices into a plurality of different feature vectors, and storing the vectors as time series data of multiplexed feature vectors, and matching means for calculating a similarity or distance value, in matching between the feature vector of the input speech from the analysis means and the time series data of the plurality of feature vectors as the multiplexed standard patterns, between a line segment connecting two points of the multiplexed feature vectors of the multiplexed standard patterns and the feature vector of the input speech.

A scheme of performing a distance calculation by using a vector which can freely move within the range defined by a line segment is disclosed in Japanese Patent Laid-Open No. 58-115490. A method of using the above distance calculation scheme is disclosed in detail in Japanese Patent Laid-Open No. 58-111099. The object of the two prior arts is to perform a high-precision distance calculation with respect to a feature vector discretely expressed in the time axis direction. This object is the same as that of the present invention. However, the present invention essentially differs from the two prior arts in that an event which continuously changes at the same time point is properly handled. The arrangement of the present invention also differs from those of the prior arts.

BRIEF DESCRIPTION OF THE DRAWINGS

FIG. 1 Is a block diagram showing a speech recognition apparatus according to the first embodiment of the present invention;

FIG. 2 is a block diagram showing a speech recognition apparatus according to the second embodiment of the present invention;

DESCRIPTION OF THE PREFERRED EMBODIMENTS

Figure 3:
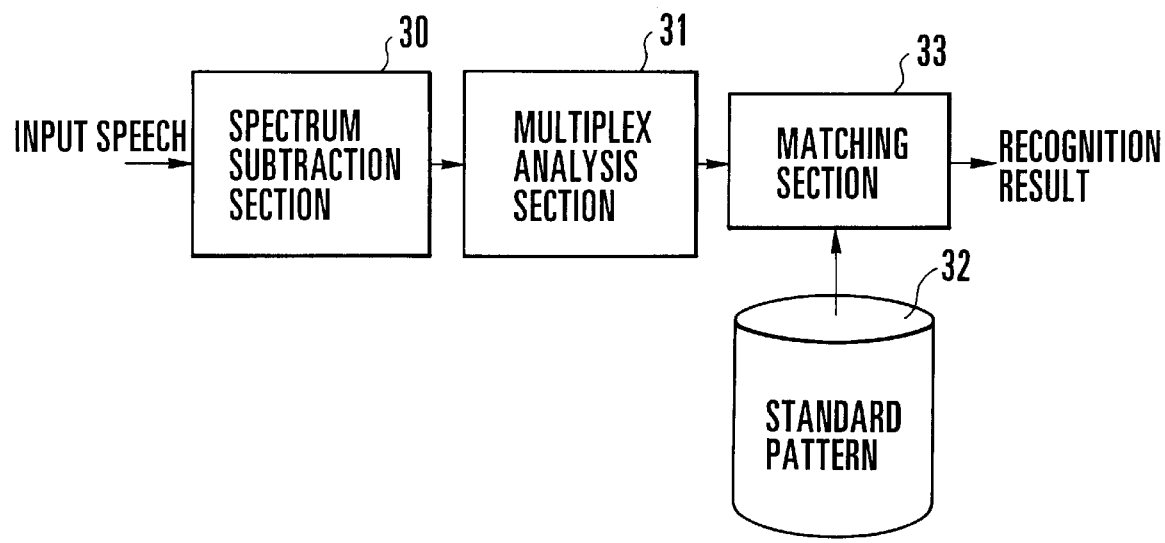
FIG. 3 is a block diagram showing a speech recognition apparatus according to the fourth and fifth embodiments of the present invention.

The principle of the present invention will be described first.

The present invention has been made to solve the problem in the conventional scheme, i.e., the problem that the feature of a standard pattern or input speech at each time point can be expressed by only a set of discrete points in a pattern space, and an event which continuously changes cannot be expressed. More specifically, in the present invention, the feature of input speech or a standard pattern at each time point is expressed as a line segment having two ends in a pattern space, and a distance calculation is performed between the points and the line segment in matching. Therefore, an event which continuously changes at each time point can be handled with a sufficiently high precision, and high speech recognition performance can be obtained.

A speech recognition apparatus according to the present invention is designed to express the feature of a standard pattern at each time point by a line segment defined by two end points in a pattern space or a set of line segments instead of a set of discrete points as in the conventional multi-template scheme. More specifically, an analysis section outputs the feature of input speech at each time point as the time series data of a feature vector. This analysis method is one of various known methods. Although all the methods will not be described, any scheme can be used as long as it is designed to output the feature vectors of speech.

Standard speaker voices are analyzed in an analysis method similar to that used in the analysis section. This analysis is performed such that the feature at each time point is expressed as two end points or a set of points within the range in which the feature can change. This operation will be described in consideration of, for example, ambient noise levels. For example, the range of possible SNRs in input speech is set to the range of 0 dB to 40 dB. Two types of voices with SNRs of 0 dB and 40 dB as two ends are converted into feature vectors. These vectors are stored as the multiplexed standard patterns. In this case, a feature is expressed by one pair of two end points. As is obvious, however, the range of 0 dB to 40 dB may be divided into four ranges to express a feature as four pairs of two end points. When a feature is to be expressed by one pair of two ends, the time series data of multiplexed feature vectors of the two end points of multiplexed standard patterns are represented by $Y_1(j)$ and $Y_2(J)$ (j=0, 1, . . . , J), and the time series data of the feature vector of input speech is represented by x(i) (i=0, 1, . . . , I).

The matching section performs matching such that non-linear expansion in the time axis direction is performed between two types of patterns having different lengths. As an algorithm for this matching, for example, a DP matching or HMM algorithm is available. In any of the methods using these algorithms, the distance between the lattice points of input and standard patterns, on the two-dimensional lattice, which are defined in the time axis direction must be obtained. Consider a distance calculation at a lattice point (i, j). In this case, the distance between a vector X(i) and the line segment represented by two end points $Y_1(J)$ and $Y_2(j)$ in a space is obtained. As in the scheme used in the above conventional technique, the distances between three points are obtained first according to three equations (1) given below:

$$A=d(Y_1(j), Y_2(j)) \quad B=d(X(i), Y_2(j)) \quad C=d(X(i), Y_1(j)) \tag{1}$$

where d(V, W) indicates an operation of obtaining the square distance between the two points V and W. Subsequently, a square distance Z is calculated on the basis of the this distance when a vertical line can be drawn from the vector x(i) to the line segment $(Y_1(j), Y_2(j))$ according to equation (2):

$$Z=\{BC-(B+C-A)^2/4\}/A \tag{2}$$

A final square distance D is determined on the following relationship in magnitude in Table 1, which corresponds to a case wherein a vertical line can be drawn and a case wherein a vertical line cannot be drawn.

TABLE 1

| D | Condition |
|---|---|
| B or C | A = 0 |
| B | A ≠ 0, B − C ≤ −A |
| C | A ≠ 0, B − C ≥ A |
| Z | otherwise |

By using such a distance calculation method, optimal standard patterns can be continuously selected always for even input speech with an intermediate SNR between 0 dB and 40 dS. A high-precision distance calculation can therefore be performed, and hence a high-performance speech recognition apparatus can be provided.

The embodiments of the present invention will be described in detail below with reference to the accompanying drawings.

The first embodiment of the present invention will be described first. FIG. 1 shows a speech recognition apparatus according to the first embodiment of the present invention. This speech recognition apparatus includes an analysis section 11 for outputting the feature of input speech at each time point as the time series data of a feature vector, multiplexed standard patterns 12 obtained by converting the features of standard speaker voices at each tine point into a plurality of different feature vectors, and storing the vectors in a storage means as the time series data of multiplexed feature vectors, and a matching section 13 for calculating the similarity or distance value at each tine point, in matching between the time series data of a feature vector of the input speech from the analysis section 11 and the time series data of a plurality of feature vectors as the multiplexed standard patterns 12, between a line segment connecting two points of the multiplexed feature vectors as the multiplexed standard patterns 12 and the feature vector of the input speech.

This speech recognition apparatus is designed to express the feature of a standard pattern at each time point, which is expressed as a set of discrete points in the conventional multi-template scheme, as a line segment defined by two end points in a pattern space or a set of line segments. The analysis section 11 outputs the feature of input speech at each tine point as the time series data of a feature vector. This analysis method includes various known methods. Although not all the methods will be described, any method can be used as long as it is designed to output the feature vectors of speech.

Standard speaker voices are analyzed in an analysis method similar to that used in the analysis section 11. This analysis is performed such that the feature at each time point is expressed as two end points or a set of points within the range in which the feature can change. This operation will be described in consideration of, for example, ambient noise levels. For example, the range of possible SNRs in input speech is set to the range of 0 dB to 40 dB. Two types of voices with SNRs of 0 dB and 40 dB as two ends are converted into feature vectors. These vectors are stored as the multiplexed standard patterns 12.

There are various conceivable events in which the feature at each time point continuously changes. For example, such events include a phenomenon in which the utterance of a speaker himself/herself changes in a high-noise environment (so-called Lombard effect), changes in speech in the acoustic space constituted by many speakers, and the like. In this case, a feature is expressed by one pair of two end points. As is obvious, however, the range of 0 dB to 40 dB may be divided into four ranges to express a feature as four pairs of two end points or by connecting these points by broken line approximation.

In this case, as standard patterns, feature vectors themselves are used. As in HEM and the Like, however, standard patterns may be expressed by average vectors, the variance therein, and the like. When the time series data of the multiplexed feature vectors at the two end points of the multiplexed standard patterns 12 are to be expressed as a pair of two end points, the time series data of the vectors at the two end points are stored as $Y_1(i)$ and $Y_2()$ (j=0, 1, .., J).

The matching section 13 performs matching such that nonlinear expansion in the time axis direction is performed between two types of patterns having different lengths. As an algorithm for this matching, for example, a DP matching or HMM algorithm is available. In any of the methods using these algorithms, the distance between the lattice points of input and standard patterns, on the two-dimensional lattice, which are defined in the time axis direction must be obtained. The similarity or distance value between the respective lattice points (i, j) is calculated between a line segment connecting two points of the multiplexed feature vectors as the multiplexed standard patterns and the feature vector of the input speech. Feature vector multiplexing may be performed for all or some of the vectors. The matching section 13 outputs the category or category sequence of standard patterns which finally exhibit the maximum cumulative similarity or the minimum distance as the recognition result.

The second embodiment of the present invention will be described next. FIG. 2 shows a speech recognition apparatus according to the second embodiment of the present invention. This speech recognition apparatus includes a multiplex analysis section 21 for converting the feature of input speech at each time point into a plurality of different feature vectors, and outputting the vectors as the time series data of multiplexed feature vectors, standard patterns 22 obtained by converting standard speaker voices into the time series data of feature vectors and storing them in advance, and a matching section 23 for calculating the similarity or distance value at each time point, in matching between the time series data of the multiplexed feature vector of the input speech from the multiplex analysis section 21 and the time series data of the corresponding feature vector as the standard patterns 22, between a line segment connecting two points of the multiplexed feature vectors of the input speech and the corresponding feature vector as the standard patterns 22.

In the prior art, input speech at each time point is expressed as one type of time series feature vector at one point in a space. In this speech recognition apparatus, however, input speech at each time point is expressed by a line segment defined by two end points or a set of line segments in the range in which the input speech can change, thereby performing speech recognition. The multiplex analysis section 21 expresses the feature of the input speech at each time point by two end points or a set of two end points, and outputs the feature as the time series data of a multiplexed feature vector. Any analysis method can be used as long as it is designed to output the feature vectors of speech. Standard speaker voices are analyzed by an analysts method similar to that used in the multiplex analysis section 21. However, multiplexing is not performed, and the standard speaker voices are constituted by standard patterns for DP matching, standard patterns for HMM, or the like.

A speech recognition apparatus according to the third embodiment of the present invention will be described next with reference to FIG. 2. In this speech recognition apparatus, the multiplexed feature vectors of input speech or multiplexed feature vectors as multiplexed standard patterns in the speech recognition apparatus according to the first or second embodiment are generated by adding noise of different levels to vectors.

An example of input speech multiplexing is a technique of using the additional noise level that continuously changes as in the speech recognition apparatus of this embodiment. In this technique, a multiplex analysis section 21 expresses two end points in a space by subtracting white noise whose upper and lower limits are determined from input speech on the assumption that the input speech is the sum of true speech (free from noise) and white noise of an unknown level. Letting y(j) be the tire series data of the spectrum of input speech, time series data $Y_1(j)$ and $Y_2(a)$ of the feature vectors generated at two ends of the white noise levels from which the input speech is subtractod are generated according to, for example, equations (3) given below:

$$Y_1(j)=C\{y(j)-w_1\} Y_2(j)=C\{y(j)-w_2\} \quad (3)$$

where $C\{.\}$ is the function for converting the spectrum into the final feature vector, and $w_1$ and $w_2$ are the upper and lower limits of the white noise level. With this operation, even if the white noise level of the input speech is unknown, the noise is properly removed at one point without fail within the predetermined range. Although this operation has been described by taking white noise as an example, noise obtained at a position where no input speech is present may be used. In this embodiment, a pair of multiplexed feature vectors are used. However, the feature may be expressed by a plurality of pairs of vectors.

A matching section 23 performs matching such that nonlinear expansion in the time axis direction is performed between two types of patterns having different lengths. As an algorithm for this matching, for example, a DP matching or HMM algorithm is available. In any of the methods using these algorithms, the distance between the lattice points of input and standard patterns, on the two-dimensional lattice, which are defined in the time axis direction must be obtained. The similarity or distance value between the respective lattice points (it j) is calculated between a line segment connecting two points of the multiplexed feature vectors of input speech and a feature vector as a standard pattern 22. The matching section 23 outputs the category or category sequence of standard patterns which finally exhibit the maximum cumulative similarity or the minimum distance as the recognition result.

The fourth and fifth embodiments of the present invention will be described next. FIG. 3 shows a speech recognition apparatus according to the fourth and fifth embodiments of the present invention. The speech recognition apparatus according to the fourth embodiment includes a spectrum subtraction section 30 for performing spectrum subtraction upon conversion of input speech into a spectrum in addition to the arrangement of the speech recognition apparatus according to the second embodiment (see FIG. 2). A multiplex analysis section 31 generates the multiplexed feature vector of the input speech by adding white noise of different levels to the spectrum output from the spectrum subtraction section 30.

Referring to FIG. 3, in the speech recognition apparatus according to the fifth embodiment, the multiplexed feature vector of input speech is generated by using flooring values of different levels for the spectrum output from the spectrum subtraction section 30.

The spectrum subtraction section 30 subtracts a spectrum n of estimated ambient noise from spectrum time series data y(j) of input speech to generate a spectrum y'(j) after noise removal according to equation (4):

$$y'(j)=j(j)-n \qquad (4)$$

Various methods of estimating ambient noise have been proposed, although all the methods will not be described below. These methods include a method of using the average spectrum of ambient noise immediately before utterance upon detection of speech, a method of using a regression average with a sufficiently large time constant regardless of speech detection, and the like. Any other methods can be used as long as they can be used for spectrum subtraction.

In the speech recognition apparatus according to the fourth embodiment, the multiplex analysis section 31 generates the multiplexed feature vector of input speech by adding white noise of different levels to the spectrum output from the spectrum subtraction section 30. More specifically, a spectrum y'(t) after spectrum subtraction includes a negative component. For this reason, when a cepstrum or a logarithmic spectrum is to be used as a feature vector, the negative component must be converted into a positive real number as the limit of logarithmic input values. As an example of this operation, the operation based on equation (5) given below is performed;

$$y''(j)=\text{Clip}[y'(j)]+\theta \qquad (5)$$

where Clip[.] indicates an operation of substituting the corresponding value for a component equal to or smaller than 0 or a predetermined positive value, and θ is the additional white noise. The white noise θ is added to adjust the operating point of logarithmic processing to be performed for conversion to a feature vector. If, for example, θ takes a large valuer the operating point increases to reduce the unevenness of a pattern after logarithmic conversion. If θ takes a small value, the unevenness of the pattern increases. With this effect, the operating point is increased for a portion, e.g., noise, which is not required for speech recognition. That is, the noise can be suppressed by reducing the unevenness of a pattern after logarithmic conversion. For speech, the unevenness of pattern after logarithmic conversion is increased (the operation point is decreased) to effectively obtain a feature.

At the time of execution of this processing, however, whether input speech is noise or speech cannot be determined. Even if such determination is possible, the determination cannot be perfect. For this reason, in the present invention, such uncertain determination processing is not used, and the two end points at which suppression is maximized and mininized, respectively, are expressed by multiplexed feature vectors to determine the optimal suppression amount for matching. That is, two types of spectra for multiplexing are obtained by using $\theta_1$ by which suppression is maximized and θ2 by which suppression is minimized according to equations (6) and (7) given below. These spectra are then converted into the final multiplexed feature vectors.

$$Y''_1(j)=\text{Clip}[y''(j)]+\theta_1 \qquad (6)$$

$$Y''_2(j)=\text{Clip}[y''(j)]+\theta_2 \qquad (7)$$

In the speech recognition apparatus according to the fifth embodiment, the multiplex analysis section 31 generates the multiplexed feature vector of input speech by using flooring values of different levels for the spectrum output from the spectrum subtraction section 30. More specifically, a spectrum y'(t) after spectrum subtraction includes a negative component. For this reason, when a spectrum or a logarithmic spectrum is to be used as a feature vector, the negative component must be converted into a positive real number as the limit of logarithmic input values. As an example of this operation, a so-called flooring operation based on the method disclosed in, e.g., M. Berouti, R. Schwarts, and J. Makhoul, "Enhancement of Speech Corrupted by Acoustic Noise", ICASSP, pp. 208–211, 1979 may be performed. In this method, a minimum value $\beta n_k$ is set for each component k, and every component below this value is replaced with a minimum value, as indicated by equation 8:

$$y''_k(j) = \begin{cases} y'_k(j) & y'_k(j) > \beta n_k \\ \beta n_k & \text{otherwise} \end{cases} \qquad (8)$$

where k is the suffix indicating the component of the spectrum, n is the spectrum of the estimated noise, and β is the constant sufficiently smaller than 1. With this processing, a positive value is provided as a logarithmic input value, thereby preventing a calculation failure. In addition, by changing the magnitude of β, the unevenness of the spectrum upon logarithmic conversion is changed, resulting in difficulty in determining the value of β. This problem is essentially the same as that solved by the speech recognition apparatus of the present invention. The optimal value of β changes depending on a noise portion so a speech portion. This value also changes depending on the overall SNR of speech. For these reasons, the value of β cannot be uniquely determined. By using $\beta_1$ by which suppression is maximized and $\beta_2$ by which suppression is minimized, therefore, two types of spectra for multiplexing are obtained according to equations (9) and (10) given below:

$$y''_1(j) = \begin{cases} y'_k(j) & y'_k(j) > \beta_1 n_k \\ \beta_1 n_k & \text{otherwise} \end{cases} \quad (9)$$

$$y''_2(j) = \begin{cases} y'_k(j) & y'_k(j) > \beta_2 n_k \\ \beta_2 n_k & \text{otherwise} \end{cases} \quad (10)$$

These spectra are then converted into the final multiplexed feature vectors. In this case, as a flooring method, the method disclosed in the above reference is described. The method indicated by equation (11) given below can also be used. Any methods can be used as long as they can be used for spectrum subtraction processing.

$$y''_k(j) = \begin{cases} y'_k(j) & y'_k(j) > \beta y'_k(j) \\ y'_k(j) & \text{otherwise} \end{cases} \quad (11)$$

Figure 4:
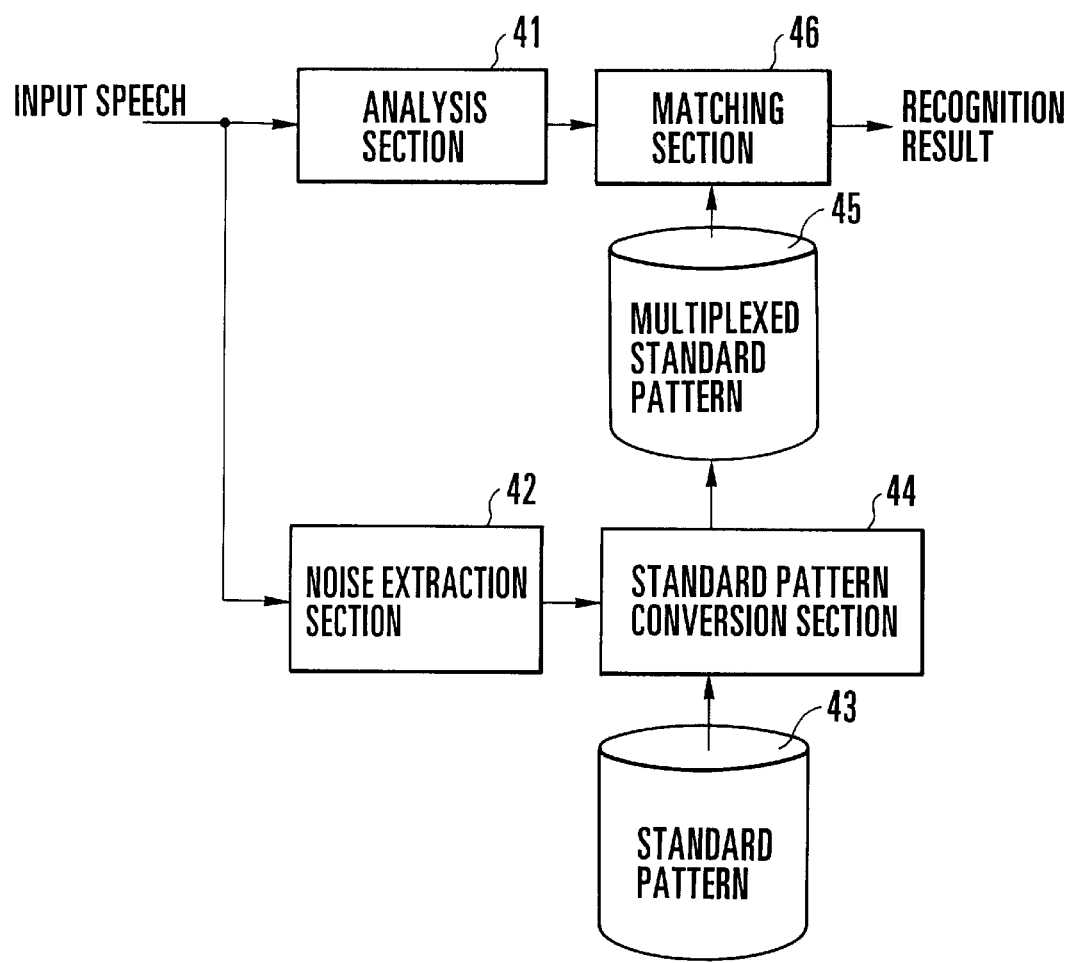
FIG. 4 is a block diagram showing a speech recognition apparatus according to the sixth embodiment of the present invention.

A speech recognition apparatus according to the sixth embodiment of the present invention will be described with reference to FIG. 4. FIG. 4 shows the speech recognition apparatus according to the sixth embodiment of the present invention. This speech recognition apparatus includes an analysis section 41 for outputting the feature of Input speech at each time point as the time series data of a feature vector, a noise extraction section 42 for extracting ambient noise from the input speech, standard patterns 43 obtained by converting standard speaker voices into the time series data of feature vectors and storing the time series data in advance, a standard pattern conversion section 44 for generating a plurality of different feature vectors by changing the level of the noise extracted by the noise extraction section 42, and adding the resultant noise to the standard patterns 43, and storing them as multiplexed standard patterns 45, and a matching section 46 for calculating the similarity or distance value, in matching between the time series data of the feature vector of input speech from the analysis section 41 and the time series data of a plurality of feature vectors as the multiplexed standard patterns 45, between a line segment connecting two points of the multiplexed feature vectors as the multiplexed standard patterns 45 and the feature vector of the speech input.

This speech recognition apparatus uses a method of estimating noise from input speech, e.g., the spectrum shape immediately before utterance, and converting standard patterns by using the noise such that the same noise environment as that of the input Is set, thereby performing recognition. Since the relative relationship (i.e., SNR) between speech and noise in noise estimation is unknown, the SNRs of the standard patterns cannot be uniquely determined. For this reason, the standard patterns 43 are written as multiplexed feature vectors defined by two end points corresponding to the maximum and minimum SNRs. If the spectrum of noise obtained immediately before, for example, the utterance of input speech is represented by n, the standard pattern conversion section 44 converts time series data y(j) of the spectra of the standard patterns 43 into spectra $y'_1(j)$ and $y'_2(j)$ of multiplexed standard patterns by using coefficients $\alpha_1$ and $\alpha_2$ at two end points, as indicated by equations (12) and (13) given below:

$$y'_1(j) = y(j) + \alpha_1 n \quad (12)$$

$$y'_2(j) = y(j) + \alpha_2 n \quad (13)$$

The multiplexed spectrum time series data are converted into the final series data of the feature vectors, and the time series data are stored as the multiplexed standard patterns 45, thereby performing matching.

Figure 5A:
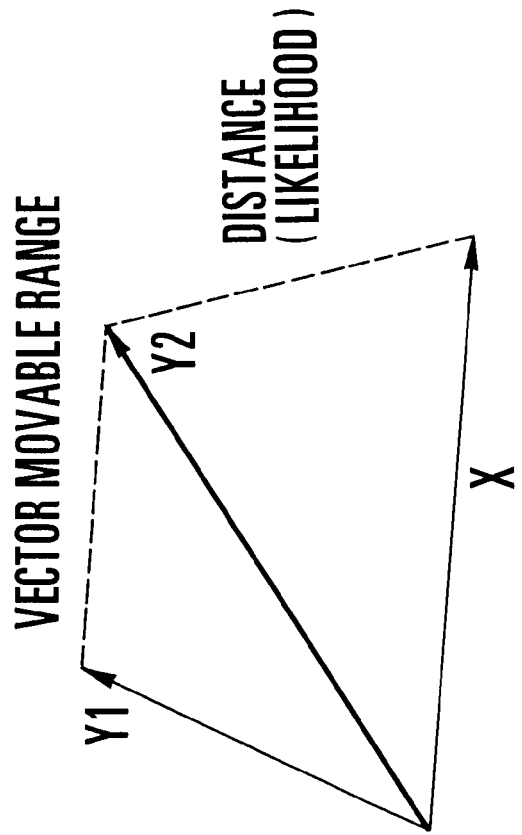
FIGS. 5A and 5B are views showing the principle of distance calculations in the speech recognition apparatus of the present invention.
Figure 5B:
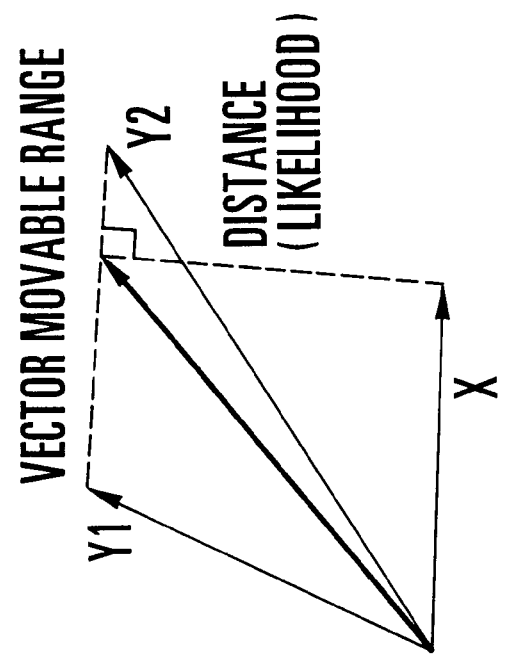

FIGS. 5A and 5B show the principle of the matching section of the speech recognition apparatus according to the present invention. In the matching section of the speech recognition apparatus according to first to sixth embodiments, the similarity or distance value at each time point is obtained between one vector (denoted by reference symbol X in FIGS. 5A and 5B) and the line segment represented by two end point vectors (denoted by reference symbols $Y_1$ and $Y_2$ in FIGS. 5A and 5B). In this case, as shown in FIG. 5A, when a vertical line can be drawn to the line segment, the similarity or distance value is calculated by using the length of the vertical line. In contrast to this, when a vertical line cannot be drawn, as shown in FIG. 5B, the similarity or distance value is calculated by using a shorter one of the distances from one vector to the two end points of the line segment.

More specifically, the distance between a vector X(i) and the line segment represented by two end points $Y_1(j)$ and $Y_2(i)$ in a space is obtained. First of all, the distances between the three points are obtained according to equation (14) as in the conventional scheme described above.

$$A = d(Y_1(j), Y_2(j)) \quad B = d(X(i), Y_2(j)) \quad C = d(X(i), Y_1(j)) \quad (14)$$

where d(V, M) indicates an operation of obtaining the square distance between two points V and M. When a vertical line can be drawn front X(i) to a line segment ($Y_1(j)$, $Y_2(j)$), a square distance Z (FIG. 5A) is calculated on the basis of this distance according to equation (15):

$$Z = \{BC = (B+C-A)^2/4\}/A \quad (15)$$

A final square distance D is determined by the following relationship in magnitude in Table 2, which corresponds to a case wherein a vertical line can be drawn and a case wherein a vertical line cannot be drawn (FIG. 5B).

TABLE 2

| D | Condition |
|---|---|
| B or C | A = 0 |
| B | A ≠ 0, B − C ≤ −A |
| C | A ≠ 0, B − C ≥ A |
| Z | otherwise |

As has been described above, according to the present invention, an event which continuously changes at each time point is expressed by a line segment defined by two end points in a pattern space or a set of line segments therein, and a distance calculation is performed by calculating the optimal distance or likelihood between a vector and the line segment, thereby provided a high-precision speech recognition apparatus.

The multi-template scheme based on the conventional method requires many sampling points to express a sufficiently wide range of changes, resulting in a large memory capacity and a large amount of distance calculations. As a result, an inexpensive apparatus cannot be provided. It, for example, an event at each time point is expressed by 10 sampling points, 10 distance calculations and a memory corresponding to the ten points are required. According to the present invention, however, the amount of calculation required to calculate the distance between one line segment and a vector corresponds to three distance calculations, and the required memory capacity corresponds to two points. A more inexpensive apparatus can therefore be provided.

What is claimed is:

1. A speech recognition apparatus comprising:

means for outputting a feature of input speech as a time series of feature vectors;

means for storing a plurality of standard voice patterns as a time series of multiplexed feature vectors converted from a plurality of standard speaker voices, wherein the multiplexed feature vectors include, at each time point, a plurality of different feature vectors; and matching means for calculating at a particular time point, a similarity or distance value between the feature vector of the input speech and the feature vectors of the standard voice patterns, by calculating a distance between the feature vector of the input speech defined for said particular time point and a line segment connecting end points of two of the multiplexed feature vectors that are defined for said particular time point.

2. An apparatus according to claim 1, wherein the plurality of different feature vectors of the standard voice patterns are generated by adding noise of different levels.

3. An apparatus according to claim 1, further comprising:

noise extraction means for extracting ambient noise from the input speech; and means for changing a level of the ambient noise extracted by said noise extraction means, and generating the plurality of different feature vectors by adding in the noise having the changed level.

4. An apparatus according to claim 1, wherein the similarity or distance value at said particular time point is obtained between an end of the feature vector of the input speech and the line segment connecting the end points of the two multiplexed feature vectors; and wherein the similarity or distance value is calculated by using a length of a perpendicular line when the perpendicular line can be drawn from the end of the feature vector of the input speech to intersect the line segment, or else by using a shorter one of distances from the end of the feature vector of the input speech to the two end points of the line segment when the perpendicular line cannot be drawn.

5. A speech recognition apparatus comprising:

multiplex analysis means for converting a feature of input speech at each time point into a plurality of different feature vectors, and outputting the plurality of different feature vectors as a time series of multiplexed feature vectors;

means for storing standard voice patterns as a time series of feature vectors converted from standard speaker voices; and matching means for calculating at a particular time point, a similarity or distance value between the feature vector of the standard voice patterns defined for said particular time point and a line segment connecting end points of two of the multiplexed feature vectors of the input speech defined for said particular time point.

6. An apparatus according to claim 5, wherein the plurality of different feature vectors of the input speech are generated by adding noise of different levels.

7. An apparatus according to claim 5, further comprising spectrum subtraction means for converting the input speech into a spectrum time series, and then performing a spectrum subtraction therefrom, wherein said multiplex analysis means generates the plurality of different feature vectors of the input speech by adding white noise of different levels to the output from said spectrum subtraction means.

8. An apparatus according to claim 7, wherein the spectrum subtraction means subtracts a spectrum of ambient noise from the spectrum time series.

9. An apparatus according to claim 5, further comprising spectrum subtraction means for converting the input speech into a spectrum time series, and then performing a spectrum subtraction therefrom, wherein said multiplex analysis means generates the plurality of different feature vectors of the input speech by adding flooring values of different levels to the output from said spectrum subtraction means.

10. An apparatus according to claim 9, wherein the spectrum subtraction means subtracts a spectrum of ambient noise from the spectrum time series.

11. An apparatus according to claim 5, wherein the similarity or distance value at said particular time point is obtained between an end of the feature vector of the standard voice patterns and the line segment connecting the end points of the two multiplexed feature vectors of the input speech; and wherein the similarity or distance value is calculated by using a length of a vertical line when the vertical line can be drawn from the end of the feature vector of the standard voice patterns to the line segment, or else by using a shorter one of distances from the end of the feature vector of the standard voice patterns to the two end points of the line segment when a vertical line cannot be drawn.

12. A speech recognition method comprising the steps of:

converting an input speech into a time series of feature vectors;

converting standard voice patterns into a time series of multiplexed feature vectors; and matching the input speech to the standard voice patterns by calculating at a particular time point, a similarity or distance value between the feature vector of the input speech defined for said particular time point and a line segment connecting end points of two of the multiplexed feature vectors of the standard voice patterns defined for said particular time point.

13. A method according to claim 12, wherein the step of converting the standard voice patterns into the time series of multiplexed feature vectors includes the step of adding noise of different levels.

14. A method according to claim 13, further comprising the steps of:

extracting ambient noise from the input speech; and changing a level of the extracted ambient noise;

generating a plurality of different feature vectors by adding the extracted ambient noise having the changed level to a time series of feature vectors converted from the plurality of standard speaker voices; and storing the different feature vectors as the multiplexed feature vectors.

15. A method according to claim 14, wherein the step of matching includes the step of selecting as the similarity or distance value a length of a perpendicular line when the perpendicular line can be drawn from an end of the feature vector of the input speech to intersect the line segment, or else, a shorter one of distances from the end of the feature vector of the input speech to the two end points of the line segment when the perpendicular line cannot be drawn.

16. A speech recognition method comprising the steps of:

converting a feature of input speech into a time series of multiplexed feature vectors;

storing standard voice patterns as a time series of feature vectors converted from standard speaker voices; and matching means for calculating at a particular time point, a similarity or distance value between the feature vector of the standard voice patterns defined for said particular time point and a line segment connecting end points of two of the multiplexed feature vectors of the input speech defined for said particular time point.

17. A method according to claim 16, wherein the step of converting the input speech into the time series of multiplexed feature vectors includes the step of adding noise of different levels.

18. A method according to claim 17, further comprising the steps of converting the input speech into a spectrum time series, and then performing a spectrum subtraction therefrom, wherein the step of converting a feature of the input speech includes the step of adding white noise of different levels to the result of the spectrum subtraction.

19. A method according to claim 17, further comprising the steps of converting the input speech into a spectrum time series, and then performing a spectrum subtraction therefrom, wherein the step of converting a feature of the input speech includes the step of adding flooring values of different levels to the result of the spectrum subtraction.

20. A method according to claim 16, wherein the step of matching includes the step of selecting as the similarity or distance value a length of a perpendicular line when the perpendicular line can be drawn from an end of the feature vector of the standard voice patterns to intersect the line segment, or else, a shorter one of distances from the end of the feature vector of the standard voice patterns to the two end points of the line segment when the perpendicular line cannot be drawn.

* * * * *